(12) United States Patent
McKean et al.

(10) Patent No.: US 6,490,659 B1
(45) Date of Patent: Dec. 3, 2002

(54) WARM START CACHE RECOVERY IN A DUAL ACTIVE CONTROLLER WITH CACHE COHERENCY USING STRIPE LOCKS FOR IMPLIED STORAGE VOLUME RESERVATIONS

(75) Inventors: Brian D. McKean, Longmont, CO (US); Noel S. Otterness, Boulder, CO (US); Joseph G. Skazinski, Berthoud, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/540,774

(22) Filed: Mar. 31, 2000

(51) Int. Cl.⁷ .............................................. G06F 12/00
(52) U.S. Cl. ....................... 711/141; 711/113; 711/114; 711/145
(58) Field of Search ................................. 711/141, 113, 711/114, 145

(56) References Cited

U.S. PATENT DOCUMENTS

| | | | |
|---|---|---|---|
| 5,537,567 A | * 7/1996 | Galbraith et al. | 711/114 |
| 5,787,459 A | * 7/1998 | Stallmo et al. | 709/201 |
| 6,073,218 A | * 6/2000 | DeKoning et al. | 710/20 |
| 6,137,043 A | * 10/2000 | Rossum | 708/290 |
| 6,148,414 A | * 11/2000 | Brown et al. | 714/11 |
| 6,182,198 B1 | * 1/2001 | Hubis et al. | 707/204 |
| 6,247,099 B1 | * 6/2001 | Skazinski et al. | 711/117 |
| 6,275,907 B1 | * 8/2001 | Baumgartner et al. | 711/119 |
| 6,289,398 B1 | * 9/2001 | Stallmo et al. | 710/5 |
| 6,381,674 B2 | * 4/2002 | DeKoning et al. | 711/113 |

OTHER PUBLICATIONS

Menon et al., "The Architecture of a Fault–Tolerant Cached RAID Controller," IEEE, pp. 76–86, 1993.*

Kaaniche et al., "A Hierarchical Approach for Dependability Analysis of a Commercial Cache–Based RAID Storage Architecture," Twenty–Eighth Annual Intl Symposium on Fault Tolerant Computing, pp. 6–15, 1998.*

Devarakonda et al., "Recovery in the Calypso File System," ACM Trans on Computer Systems, vol. 14, No. 3, Aug. 1996, pp. 287–310.*

Islam et al., "An Essential Design Pattern for Fault–Tolerant Distributed State Sharing," Communications of the ACM, vol. 39, No. 10, Oct. 1996, pp. 65–74.*

\* cited by examiner

*Primary Examiner*—Matthew Kim
*Assistant Examiner*—Stephen Elmore (57) ABSTRACT

A storage volume reservation system and method for maintaining cache coherency amongst a plurality of caching controllers in a data storage system during a warm start cache recovery utilizing a stripe lock data structure. The stripe lock data structure is defined to maintain reservation status of cache lines within data extents that are part of a logical unit or storage volume. A battery backup unit (BBU) stores stripe lock data structure and dirty cache line data of each of the plurality of controllers during a power failure. Using the stripe lock data structure, a delay required for continued processing of I/O requests from one or more host computers following the warm start cache recovery is minimized. Without saving the stripe lock data structure, continued processing of I/O requests from one or more host computers requires reestablishing stripe locks, during the warm start cache recovery, for cache line data saved before the power failure. A computer program product for maintaining cache coherency amongst a plurality of caching storage controllers in a data storage system during a warm start is also provided which includes a computer readable medium and a computer mechanism stored thereon for implementing the inventive method and procedures thereof. Advantages of the invention include eliminating the delay required to re-establish stripe locks in order to flush dirty cache line data to a storage volume during a warm start cache recovery.

19 Claims, 10 Drawing Sheets

WARM START CACHE RECOVERY IN A DUAL ACTIVE CONTROLLER WITH CACHE COHERENCY USING STRIPE LOCKS FOR IMPLIED STORAGE VOLUME RESERVATIONS

FIELD OF THE INVENTION

The present invention relates to a storage volume reservation system and method. More particularly, the present invention relates to a storage volume reservation system and method for maintaining cache coherency amongst a plurality of caching controllers in a data storage system during a warm start cache recovery.

BACKGROUND OF THE INVENTION

Figure 1:
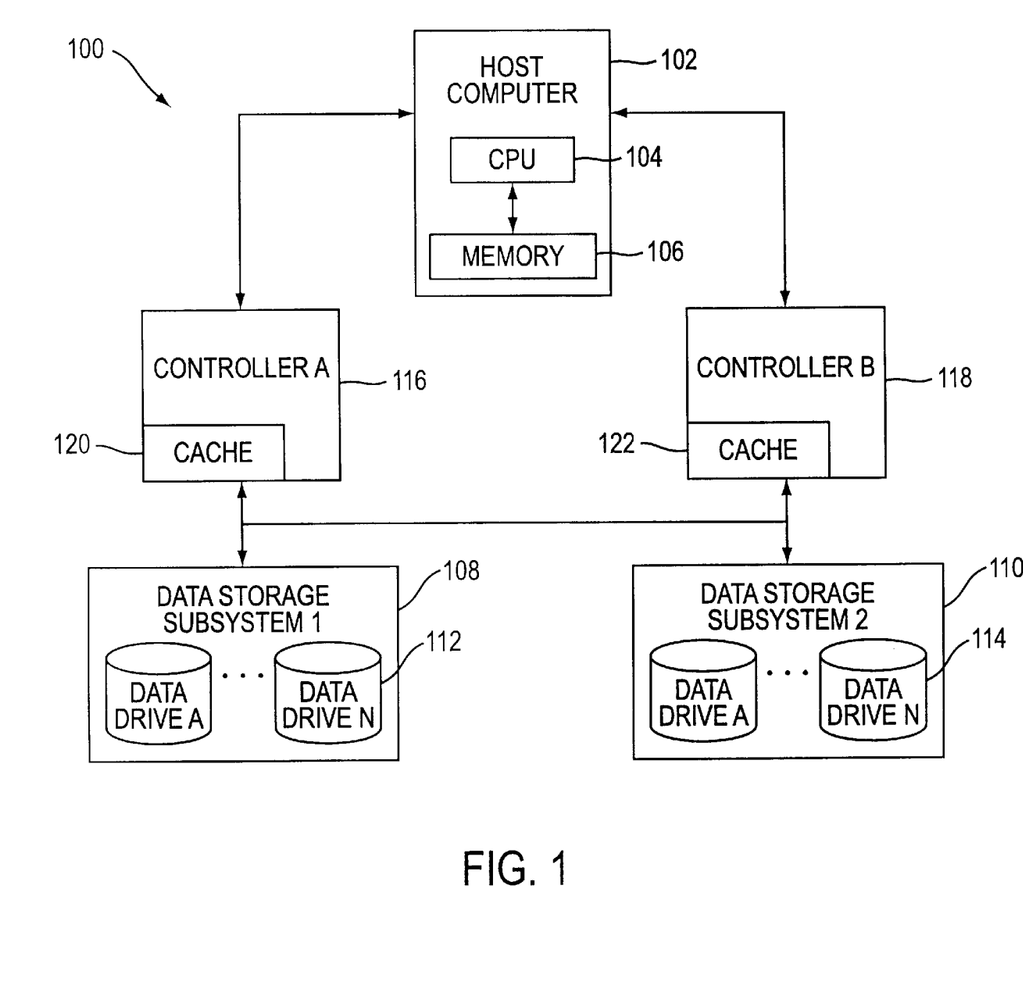
FIG. 1 is a diagrammatic representation of an exemplary computer system to which the inventive structure and method may be applied.

In FIG. 1 there is illustrated a typical computer system 100 having a host computer 102 with a processor 104 and associated memory 106, one or more data storage subsystems 108, 110 each having a plurality of hard disk drives 112, 114, first and second storage controllers 116, 118 coupled between the host computer and the storage subsystem by interfaces and communications links of conventional type, such as for example, busses or network connections. When the first and second controllers 116, 118 are caching storage controllers (described below), each controller includes a cache memory 120, 122 that serves as intermediate storage. Usually the cache memory is fast random access memory (RAM) of which there are many types.

Increasingly, there is a need to provide access to stored information or data on hard disk drives (or other storage devices) from a plurality of host servers and to also permit the data stored on any particular storage device to be accessed through alternative device controllers. Providing access to the data from multiple hosts eliminates the need to store the data at more than one location (though the data may still be redundantly stored using known mirroring or Redundant Array of Independent Disk (RAID) techniques) and in theory assures that the identical data can be accessed by interested parties. Providing multiple access to a storage device through a plurality of controllers, provides redundant access to the device from an alternate (or second) controller so that the data remains accessible in the event that the first controller fails.

Although providing access to storage devices through multiple controllers is desirable, such a configuration may present data consistency problems. Data consistency refers to all controllers providing visibility to one identical copy of the data. Data consistency can be provided through data synchronization or data coherency or both. Data coherency refers to maintaining a consistent copy of the data in each of the controllers caches. Data synchronization refers to keeping the data in the storage controller's cache the same as that in the storage device.

A storage controller is a device which is capable of directing data traffic from the host system to one or more non-volatile storage devices. It may or may not have an intermediary cache to stage data between the non-volatile storage device and the host system. A caching controller (or caching storage controller) is a device which is capable of directing the data traffic from a host system to one or more non-volatile storage devices which uses an intermediary data storage device (the cache memory) to stage data between the non-volatile storage device and the host system. In general, the intermediary storage device is built out of RAM to allow a quicker access time to the data. Furthermore, it provides a buffer in which to allow exclusive-or (XOR) operations to be completed for RAID 5 operations. Multiple active controllers are defined as a collection of storage controllers or caching storage controllers which work in a cooperative manner with each other. They provide the ability for recovering from a controller failure by allowing multiple paths to a storage volume. The storage volume is a contiguous range of randomly accessible sector of data. For practical purposes, the sector numbering starts at 0 and goes to N, where N is the total number of sectors available to the host system. A data extent is a range of data within a storage volume delineated by a starting sector and an ending sector. The storage volume is broken up into a number of data extents which are not required to be of equivalent sizes, but may not overlap. These concepts are used in the discussion of the background and the detailed description of embodiments of the invention, and apply to both.

Caching storage controllers that work independently of one another to store information or data to a secondary storage unit, such as a hard disk drive, or tape unit, are conventionally available. There are also caching storage controllers that work with one or more other controller(s) to provide multiple controller access to a secondary storage unit and provide a fault tolerant environment. If two controllers are simultaneously providing access to a common set of storage devices and each is able to take over the other's functionality in the event of a failure, then those controllers are referred to as active-active or dual-active controllers.

Computer system configurations involving one or more host computers and having two or more controllers that use cache technologies, with access to a storage device through any of the controllers, should desirably provide some mechanism of ensuring that the cache data in each controller is always correct. Unfortunately in conventional systems they may not. Controllers using the SCSI command set could use two commands that are provided in that command set, the "Reserve LUN" and "Release LUN" commands, where LUN is an abbreviation for Logical Unit Number. (SCSI commands, including the Reserve LUN and Release LUN commands, are described in standard references including SCSI-2 Small Computer System Interface-2 ANSI X3.131:1994: which is incorporated herein by reference.) The host computer, especially one operating in a cluster environment, could use these two commands to reserve all accesses to the entire LUN.

Unfortunately, not all host computers use these SCSI commands. Furthermore, the Reserve LUN and Release LUN commands do not provide for reservation of a portion of a storage volume because they apply to the entire storage volume.

Figure 2:
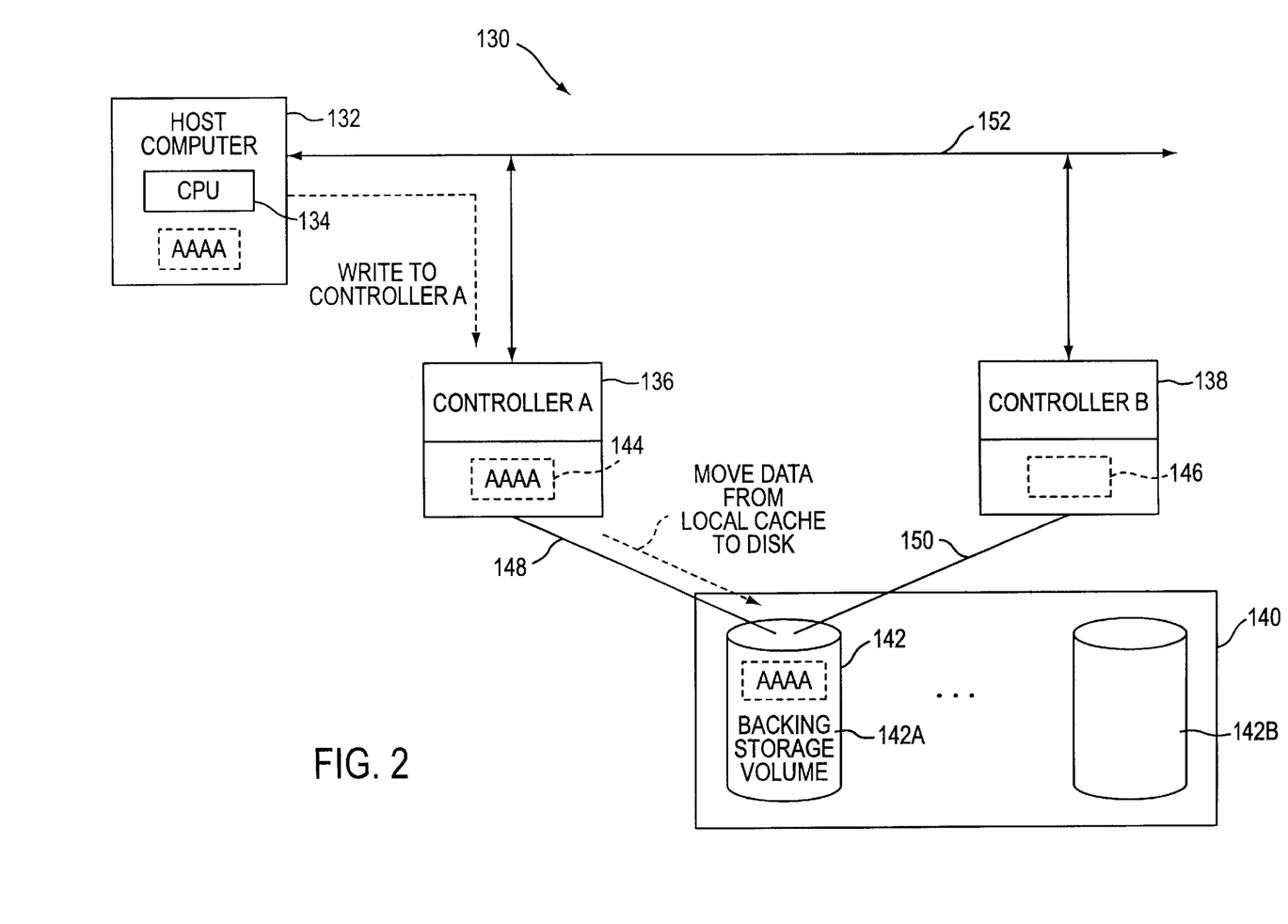
FIG. 2 is a diagrammatic representation of a host computer request to write data to a first controller in a dual-active controller environment.

The following description is provided relative to FIG. 2, and sets forth the problems with data synchronization between controllers which maintain local cached copies of data. This example details one set of host transactions that could cause data integrity problems (data consistency and data synchronization problems). The data consistency problem is brought about by the fact that each controller's cache operates independently.

With reference to the illustration in FIG. 2, there is shown a portion of computer system 130, including host computer 132 having a processor or central processing unit (CPU) 134, first controller (controller "A") 136, second controller (controller "B") 138, a storage subsystem 140 including at least one backing storage volume 142. Each of the two controllers 136, 138 further separately include first cache (Cache "A") 144 and second cache (Cache "B") 146 for caching data retrieved from backing storage volume 142. Generic techniques for controller caching are known in the art and not described further here. Backing storage volume 142 is coupled to each of first and second controllers 136, 138 by storage interface channels 148, 150, and the host computer processor (CPU) 134 is coupled to the controllers by CPU-to-storage device interface 152 The interface 152 may typically be implemented as a Personal Computer Interface (PCI), parallel SCSI, fibre channel, or IEEE-1394 (fire-wire) interface using a storage, file system, or other communications protocol. In like manner, the controller-to-storage device interfaces 148, 150 may typically be implemented using the same set of interfaces and protocols as just described for interface 152. A logical unit number (LUN) is assigned or otherwise associated with each backing storage volume 140. The relationship between physical devices or portions thereof and logical devices is known in the art and not further described here.

In this configuration, if data is written to a logical unit, such as backing storage volume 142A through first controller 136, the data is properly retained in the first controller's cache, that is within cache 144. If data is subsequently written to logical storage unit 142A through second controller 138, the newly written data in backing storage volume 142A matches the data in the second controller's cache 146, but the information in the first controller's cache 144 will not have been updated, and (if the newly written data is different from the original data) no longer matches the data written to the backing storage volume 142A. If a request to read the data is made through first controller 136, the data will be read from cache 144 according to standard data caching and retrieval practices to minimize backing storage volume access, and the wrong information will be returned to the requestor. The data is said to lack coherency between different locations (that is between one or more of the backing storage volume, cache 144, and cache 146), and is out of temporal synchronization as a result of the time-order of events involving the read, write, and caching operations.

Figure 3:
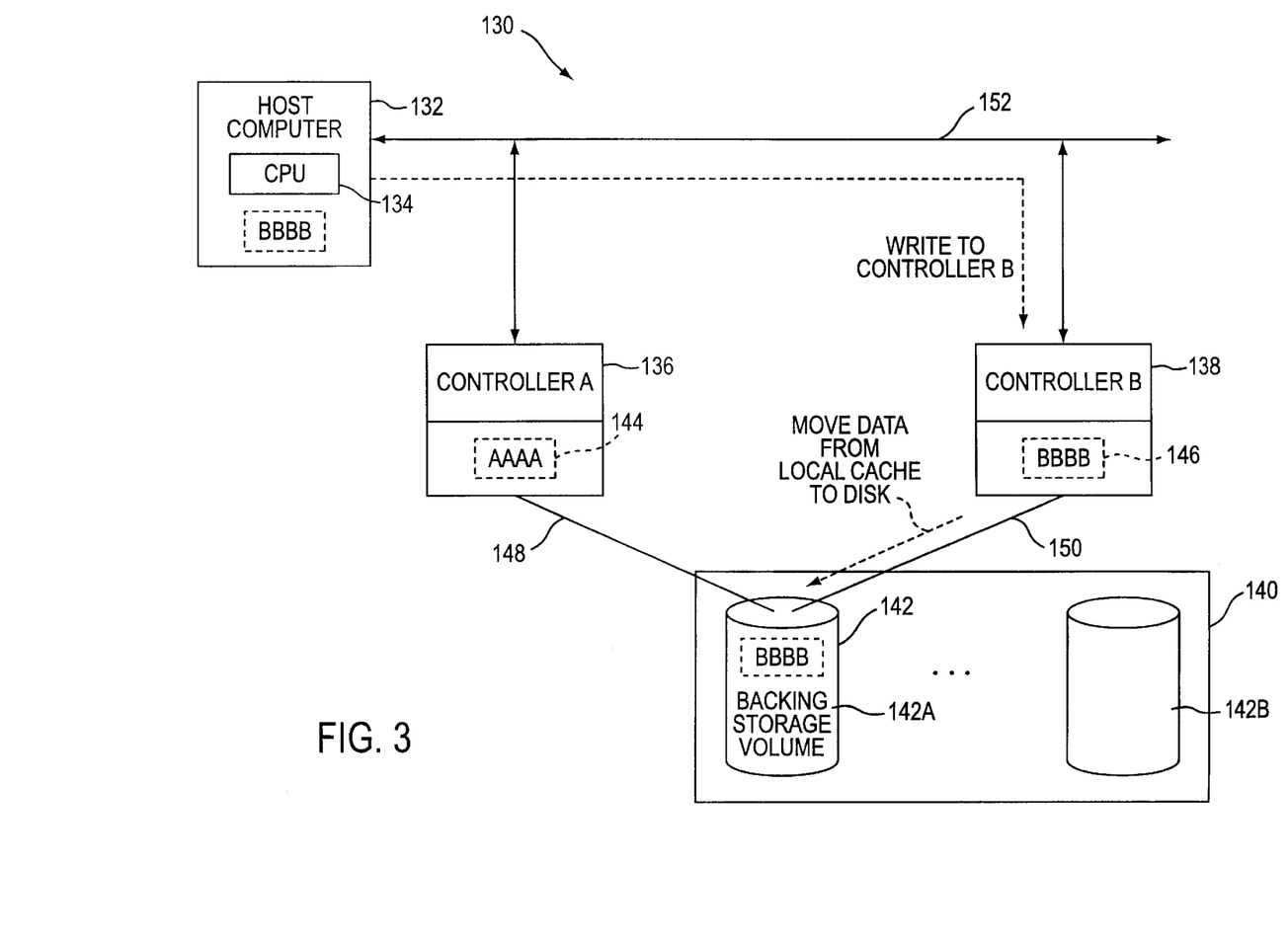
FIG. 3 is a diagrammatic representation of a host computer request to write data to a second controller in a dual-active controller environment where the write request is to the same storage device sector as in FIG. 2.

Stating the problem by way of example in somewhat more concrete terms, in a system with two controllers 136, 138 attached to the same CPU/storage interface and sharing access to a backing storage volume 142, as illustrated in FIG. 2, host computer 132 writes data pattern "AAAA" to the backing storage volume through first controller 136. First controller 136 retains this information in its data cache 144 so that future requests for the data can be fulfilled without having to access the disk backing storage volume 142A. At a later time, the host computer writes the data pattern "BBBB" to backing storage volume 142A at the same location the "AAAA" data pattern had been stored, but now the write operation is directed through the second controller 138 as illustrated in FIG. 3. First controller 136 still has the "AAAA" data pattern stored in its cache 144, but second controller 138 has the "BBBB" data pattern stored in its cache 146. The data in cache 144 ("AAAA") and the data in cache 146 ("BBBB"), each supposedly representing the identical data, no longer match and are incoherent.

The correct data pattern on backing storage volume 142A ("BBBB") is the later data pattern also stored in cache 146 ("BBBB"), but if the host computer 132 attempts to read the information from backing storage volume 142A through first controller 136, first controller 136 will, using conventional techniques, be unaware of any controller 138 operations, and in particular will be unaware that a write operation has altered the data on the backing storage volume. Lacking knowledge that the data has changed, first controller 136 will access it's own cache 144 to retrieve the data, and erroneously return that data pattern ("AAAA") rather than the correct data pattern ("BBBB") to the requesting host computer 132.

One technique for overcoming the data consistency problem described above is a storage volume reservation system and method as described in co-pending U.S. patent application Ser. No. 09/325,033, now U.S. Pat. No. 6,247,099, which is hereby incorporated by reference. The storage volume (or storage LUN) reservation system for active controllers in an environment allows data access through two or more separate caching controllers. The inventive structure and method maintains a "reservation table" (such as a LUN reservation table) that is always consistent on each of the plurality of controllers. This structure and method also provide the capability of explicitly reserving storage volumes using any current storage volume (or LUN) reserve commands, or implicitly using a write operation. The inventive structure and method also provide the capability of invalidating a controller's cache based on acquiring new reservation.

The storage volume reservation system and method provide that each controller is not required to reserve a storage volume in order to perform an update to that storage volume. An explicit reservation may be made through the use of Storage Volume Reserve commands, while an implicit reservation is made whenever a write operation requires that the particular controller obtain a reservation. Implicit reservations may occur for example when an alternate controller already owns the reservation. The reservation may also be obtained implicitly when the controller is required to perform a read operation, and the alternate controller already owns the reservation. This reservation requirement is imposed in order to ensure that the alternate controller's cache contains no data (dirty data) that has not been synchronized with the storage volume drive.

The reservation process is synchronized between all of the controllers in the system in order to maintain reservation table coherency. All updates to the reservation table are propagated to the alternate controllers to maintain reservation table coherency. This procedure allows most reads and writes to be performed with minimal overhead. An I/O operation to a storage volume that is reserved by that controller only needs to check for that ownership before processing the I/O operation request.

The reservation process also benefits from cache flushing and cache invalidating in some circumstances to maintain data integrity. Obtaining a reservation to a storage volume or portion there of that is not owned by any controller is straightforward and only requires an update to the reservation table, and it's propagation to all alternate controllers. Obtaining a reservation to a storage volume or portion thereof currently owned by an alternate active controller further requires that the alternate controller flush and invalidate all cache data associated with that storage volume. Releasing a reservation is not required but may optionally be performed using storage volume release command.

The problem with the storage reservation system and method described above is what to do with cache data preserved by a battery backup unit (BBU) during a warm start cache recovery. In order to maintain data coherency, the dirty cache lines need to be written out to the disk. In addition, each controller needs access to the area of the storage volume required to write out the caches line that it owns such that the access is coordinated in order to maintain data integrity. Consequently, a storage volume reservation must be re-acquired for each dirty cache line. In fact, the entire process of storage volume reservation needed to maintain cache coherency must be repeated before any new input output (I/O) processes can be accepted. In addition, any host initiated I/O that occurs before the dirty data from the warm start is written out must have it's access to the storage volume coordinated so that data integrity is maintained. Any host I/O processes that were running power to the power off are discarded, while any rebuild operations in process are either discarded or restarted depending on whether the automatic rebuild feature is enabled.

Therefore, there remains a need to overcome the above limitations in the existing art which is satisfied by the inventive structure and method described hereinafter.

SUMMARY

The present invention overcomes the identified problems by providing a storage volume reservation system, method, and computer program for maintaining cache coherency amongst a plurality of caching controllers in a data storage system during a warm start cache recovery. More specifically, the invention provides a method of maintaining cache coherency amongst a plurality of caching storage controllers in a data storage system during a warm start utilizing a stripe lock data structure. The stripe lock data structure is defined to maintain reservation status of cache lines within data extents that are part of a logical unit or storage volume. A battery backup unit (BBU) stores stripe lock data structure and dirty cache line data of each of the plurality of controllers during a power failure. Using the stripe lock data structure information, a delay required for continued processing of I/O requests from one or more host computers following the warm start cache recovery is minimized. Without saving the stripe lock data structure, continued processing of I/O requests from one or more host computers requires reestablishing stripe locks, during the warm start cache recovery, for cache line data saved before the power failure.

The inventive structure and method provide a storage volume reservation system in a computing environment that allows data access through two or more caching controllers. The stripe lock data structure is defined in memory within each of the two or more caching controllers. The stripe lock data structure is used to provide consistent information within each of the two or more caching controllers. A battery backup unit is configured to save the stripe lock data structure and cache line data of each of the two or more caching controllers during a power failure. The cache line data structure minimizes a delay required for continued processing of I/O requests from one or more host computers following the warm start cache recovery.

A computer program and computer program product for maintaining cache coherency amongst a plurality of caching storage controllers in a data storage system during a warm start is also provided which includes a computer readable medium and a computer mechanism stored thereon for implementing the inventive method and procedures thereof.

Advantages of the inventive method and structure eliminate the delay required to re-establish stripe locks in order to flush dirty cache line data to a storage volume during a warm start cache recovery.

BRIEF DESCRIPTION OF THE DRAWINGS

Additional advantages and features of the invention will become readily apparent upon reading the following detailed description and appended claims when taken in conjunction with reference to the following drawings, in which:

DETAILED DESCRIPTION OF EMBODIMENTS OF THE INVENTION

The present invention overcomes the identified problems described above by providing a storage volume reservation system and method for maintaining cache coherency amongst a plurality of caching controllers in a data storage system during a warm start cache recovery. The inventive structure and method provide the storage volume reservation system in a computing environment that allows data access through two or more caching controllers utilizing a stipe lock data structure. The stripe lock data structure is defined in memory within each of the two or more caching controllers. The stripe lock data structure insures the existence of consistent information within each of the two or more caching controllers. A battery backup unit is configured to save stripe lock data structure information and cache line data of each of the two or more caching controllers during a power failure. The stripe lock data structure information enables continued processing of I/O requests from one or more host computers without having to reestablish stripe locks, during a warm start cache recovery, for cache line data saved before the power failure. In the detailed description that follows, headers are provided merely as a convenience to the reader and should not be interpreted as limiting the description to only the subject matter identified by the header. Aspects of the invention are described throughout all parts of the specification and drawings.

Stripe Lock Array

The Storage Volume Reservation system includes a stripe lock array of Stripe Lock Records (SLR). The stripe array of SLRs is a data structure defined in a memory of each controller for the embodiment now described. (Other embodiments of the inventive structure and method may provide for Stipe Lock Array(s) that exist in location(s) separate from the controllers.) The layout or configuration of this data structure may be identical for each controller, but the actual contents stored within the SLR data structure will typically be specific to each individual controller. Each SLR includes an ID field which functions as an index in the stripe lock array. Each SLR includes the following data fields: an Ownership Field, a Lock Type Field, an Extent Field, a Use Count Field a Linked List of Pending Locks, a Linked List of Input/Output Processes (IOP)s, a State Field, and a Lock Wait Count Field.

The Ownership Field specifies either that the controller in which the SLR resides holds a stripe lock for a storage volume, or that another controller holds a stripe lock for the storage volume. The Lock Type Field identifies one of the following data extent lock status: (a) the controller owns a "full lock" of the storage volume, (b) the controller owns one or more number "partial locks" of data extents of the storage volume, or (c) certain data extents of the storage volume are temporarily blocked. The Extent Field includes the storage volume in which the stripe locks exists as well the Initial Block where the stripe lock begins and the Final Block where the stripe lock ends. The Use Count Field tracks the number of any operations working with the stripe lock. The operations include IOPs, write-back cache lines and rebuild operations. The Use Count Field allows the controller to determine when a stripe lock may be released. Referring to Table I, an exemplary embodiment of the Stripe Lock Record is illustrated.

TABLE I

Structure of Exemplary Embodiment of Stripe Lock Record

| | | Lock Type | | | Extent | | | | | | Lock |
| | | | | | | | | | | | Wait |
| Owner | ID | Lock | Block | Full | Storage Volume | Start Sector | num Sector | Use Count | Pending Locks | IOP List | State | Count |
| --- | --- | --- | --- | --- | --- | --- | --- | --- | --- | --- | --- | --- |
| A | 10 | 1 | 0 | 0 | 0 | 10 | 12 | N | Lock1, ..., Lock3 | IOP1, ..., IOPN | Lock Active | 0 |

The Pending Locks Field is a linked list of lock requests for the stripe lock in question. Once the Use Count Field equals zero, the controller may transfer the stripe lock to the next lock request in the Pending Locks linked list. The IOP List Field is a Linked list of IOPs that varies depending on whether a State Field the stripe lock is active or pending. When the stripe lock is active, the IOP List includes a list of IOPs using the stripe lock. When the stripe lock is pending, the IOP List includes a list of IOPs waiting for the lock to be granted. The Lock Wait Count Field is a count of the number of stripe locks a stripe lock request will cover.

The SLR State Field provides a set of six flags which allow a quick check to be made to determine the state of stripe locks for a storage volume. The stripe lock state may be any one of NO_LOCKS (nobody currently owns any locks), PARTIAL_LOCKS (this controller owns pieces of the storage volume, but not the entire storage volume), BLOCK_LOCK (a temporary blocking lock is in place for this storage volume, likely indicating that another controller is performing an operation such as a rebuild or consistency check), LOCAL_RESERVATION (this controller has a SCSI Reserve command outstanding for this storage volume), and REMOTE_RESERVATION (another controller has a SCSI Reserve command outstanding for this storage volume). These flags may advantageously be implemented by setting a single binary bit is a predetermined bit-position to either a first logical state (e.g. "0") or to a different second logical state (e.g. "1").

Referring to Table I, an example of an embodiment of a stripe lock record (SLR) is depicted for a system with one or more storage volumes. Storage Volume 0 has partial locks only. The stripe lock is active and spans storage volume blocks 10 to 12. In addition, the stripe has three pending locks (Lock1 . . . Lock3) and is being utilized by N IOPs (IOP1 . . . IOPN). Pseudo code for an exemplary embodiment of the Storage Volume Reservation Table and Storage Volume Reservation Table Entries is provided in Table II.

TABLE II

Exemplary pseudo-code for the storage volume reservation table.

```
typedef enum
{
    LOCK_FREE = 0,          /* On free list      */
    LOCK_REQUESTED = 1,     /* Lock request in progress    */
    LOCK_PENDING = 2,       /* Lock request Acknowledged, not granted yet   */
    LOCK_ACTIVE = 4,        /* Lock granted and in use    */
    LOCK_UNUSED = 5,        /* Owned by this controller but not used    */
    LOCK_CLEARING = 6,      /* In use by clearing so other controller can get
                               pending lock       */
} LockState;
typedef struct Extent
{
    U32 systemDrive;
    U32 startSector;
    U32 numSectors;
} Extent,
typedef union LockType
{
    struct {
    int     lock:1;
    int     block: 1;
    int     spare: 29;
    int     full; 1,
    } b;
    U32     word;
}Locktype;
typedef struct StripeLock
{
    U16             owner;          /* Controller owing this lock                */
    U16             id;             /* Index of lock in lock array               */
    LockType        type;           /* Lock type                                 */
    Extent          extent;         /* Stripe extent covered by Lock             */
    U32             useCount;       /* Total users of the lock                   */
                                    /* = IOPS - WB Cache lines - rebuild         */
    QueueLink       *pendingLocks;  /* Locks that cannot be granted until this
                                       lock is released. Note that multiple
                                       locks may be pending in this one         */
    QueueLink       *iopList;       /* When the lock is pending this is the list
                                       of IOPS to schedule when it's granted.
                                       When lock is active this is the list of
                                       IOPS using the lock. */
    LockState       state;          /* State of lock as lock is acquired and used
                                       */
    U32             lockWaitCount;  /* A count of locks that this lock is waiting
                                       on */
} StripeLock;
typedef struct StripeLockArray
{
    #define MAX_SL_ENTIES       100;                    /* Maximum number of
                                                           stripe lock*/
    StripeLock      StripeLockArray [MAX_SL_ENTRIES]    /* Stipe Lock Array*/
} StripeLockArray;
```

Storage Volume Ownership Transaction (SVOT)

The Storage Volume Ownership Transaction (SVOT) data structure is a data structure established in program memory of the controller and tracks the state of a current transaction between the controller in which the data structure is resident and an alternate controller. (The alternate controller also has a storage volume ownership transaction data structure.) A Transaction Value, a Current Status, a Time Stamp Value, a Reference to a Host Command, and a Reference to the Code that handles transaction completion are maintained in the Storage Volume Ownership Transaction data structure. The Transaction Value is a unique identifier used to initiate a Storage Volume Ownership Request and to track the corresponding Storage Volume Ownership Response. The Current Status value is a state variable that maintains the current state of the transaction. Current status may take on the values of LOCK_REQUESTED, LOCK_PENDING, LOCK_GRANTED or LOCK_CLEARING. The Time Stamp value is used to mark the time when a transaction started. This starting time is used to track how long a lock request has been active but not yet granted. The SLRs of the stripe lock array are updated when the Storage Volume Ownership Transaction establishes a stripe lock.

Storage Volume Ownership Request (SVORQ)

The Storage Volume Ownership Request (SVORQ) is a message sent from one controller to another controller requesting a change on SLR of the stripe lock array. The Storage Volume Ownership Request uses the Lock Request Data Structure to contain information to send to another controller to establish a lock.

Lock Request Data Structure (LRDS)

The Lock Request Data Structure (LRDS) is a data structure that is sent as a message to another controller in order to establish a lock on a storage volume. The LRDS data structure includes a parameter identifying the starting sector for this lock region (startSector), a parameter identifying the number of sectors to force to disk and invalidate (numSectors), a parameter that provides a unique identifier to allow other controllers which received the lock requests to determine who made the request (Controller ID), a parameter used to uniquely identify which lock is being serviced (lockIdentifier) which also helps to keep track of a lock to a sequence number rather than having to determine which lock is being handled through the Extent parameter. It also includes a parameter that identifies the storage volume for which the lock is being requested (storage Volume Number), a parameter which identifies the type of lock being requested. Recall that the type of lock may be either RESERVATION, FULL, PARTIAL, or BLOCK.

TABLE III

Exemplary pseudo-code for an embodiment of a Lock Request Data Structure.

```
typedef struct
{
    /*
    ** Controller ID is a unique identifier to allow
    ** other controllers which received the lock requests
    ** to determine who made the request
    */
    U32 controllerID;
    /*
    ** The Lock Transaction Identifier is used to be able to
    ** uniquely identify which lock is being serviced. It helps
    ** to be able to keep track of a lock to a sequence
    ** number rather than having to determine which lock is
    ** been handled through the storageVolumeNumber,
    ** and LockExtent.
    */
    U32 lockIdentifier;
    /*
    ** This is the storage volume for which the
    ** lock is being requested
    */
    U32 storageVolumeNumber;
    /*
    ** The lock type identifies what type of lock is being
    ** requested
    */
    LockType reqType;
    /*
    ** Primary Lock Request
    ** This is the region which must be flushed before the
    ** host requests can be serviced
    */
    Extent primary;
    /*
    ** Secondary Lock Request
    ** This is a region which needs to be flushed before broth
    ** lock can be coalesced with another lock or before the
    ** entire data extent can be locked
    */
    Extent secondary;
} LockRequest;
```

The Primary Lock Request parameter (Lock Extent primary) identifies the region of the storage volume which must be flushed before the host requests can be serviced by the requesting controller. The Secondary Lock Request parameter (LockExtent secondary) identifies the region of the storage volume which needs to be flushed before the lock can be coalesced with another lock (such as with a previously established partial lock) or before the entire data extent of the storage volume can be locked.

Storage Volume Ownership Response (SVORP)

The Storage Volume Ownership Response is a message that is sent in response to a Storage Volume Ownership Request message. The responses is always sent for every request received. The message contains data fields which pass back of the status of the request and the transaction value. The status of the request can be either "granted" or "rejected". The transaction value is used by the sender to track responses to their corresponding requests. The transaction value is copied from the received request.

Storage Volume Structure

Figure 4:
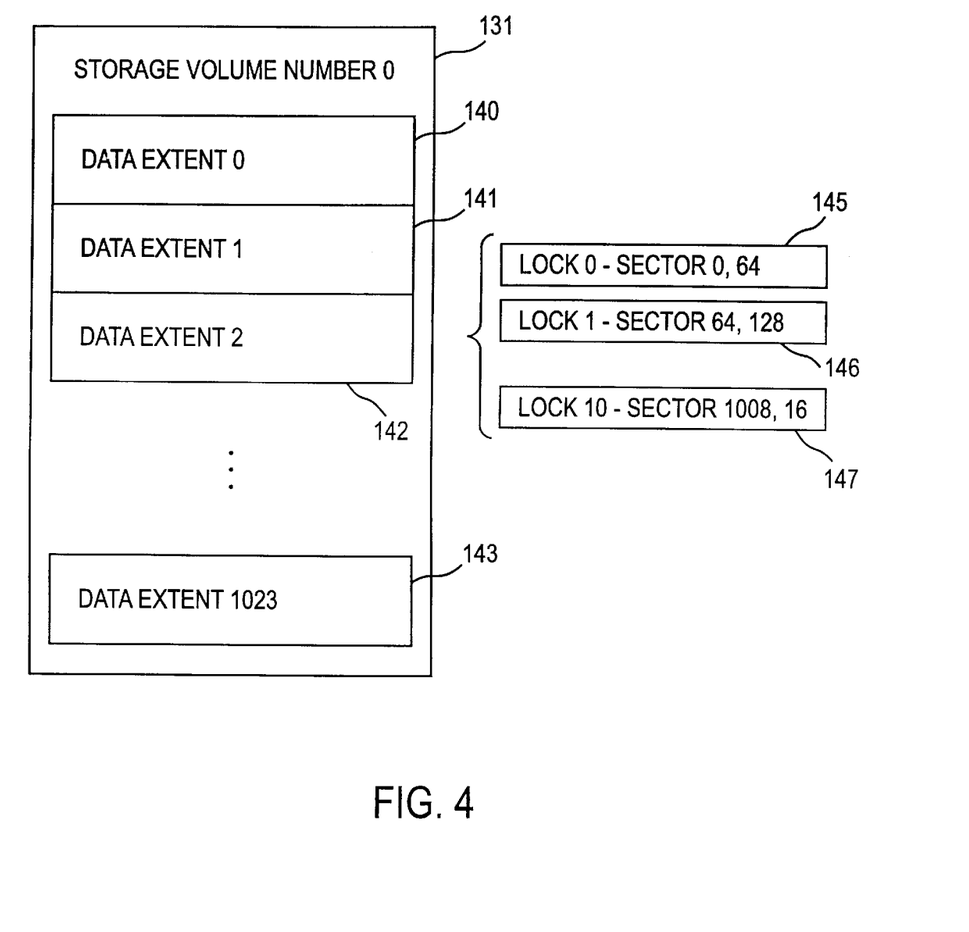
FIG. 4 is a diagrammatic illustration illustrating cache coherency for dual-active controllers each having a cache and accessing a common storage volume.

We now describe an embodiment of a storage volume 200 of the current invention with respect to the diagrammatic illustration in FIG. 4. Advantageously, a user configuration tool (such as, for example the Global Array Manager configuration tool made by Mylex Corporation) is used during controller initialization to create the storage volume or volumes. Such an interactive process advantageously permits the user to create the appropriate size storage volume with desired redundancy attributes. Preferably, every storage volume 200 is assigned a unique number and all host accesses use that storage volume number to perform I/O operations, such as for example read and write operations (reads and writes).

In the embodiment illustrated in FIG. 4, the storage volume is assigned number zero ("0"). This storage volume has a total size of 512 MB which is broken up into 1024 data extents, each extent holding 1024 sectors, with each sector having 512 bytes.

Those workers having ordinary skill in the art will appreciate that the storage volumes described here are exemplary and that storage volumes having a different total size and/or broken up into a different number of data extents, sectors, and bytes may be used in conjunction with the inventive structure and method. The embodiment in FIG. 4 also illustrates an exemplary structure for the second data extent 142 having three outstanding locks 145, 146, 147. The first lock (lock 0) 145 is locking the first 64 blocks starting at sector 0. This is indicated by the notation "Lock 0—Sector 0,64". The second lock (Block 1) is locking 128 blocks starting at sector 64. The last lock (Lock 10) is locking the last 16 blocks.

Figure 5:
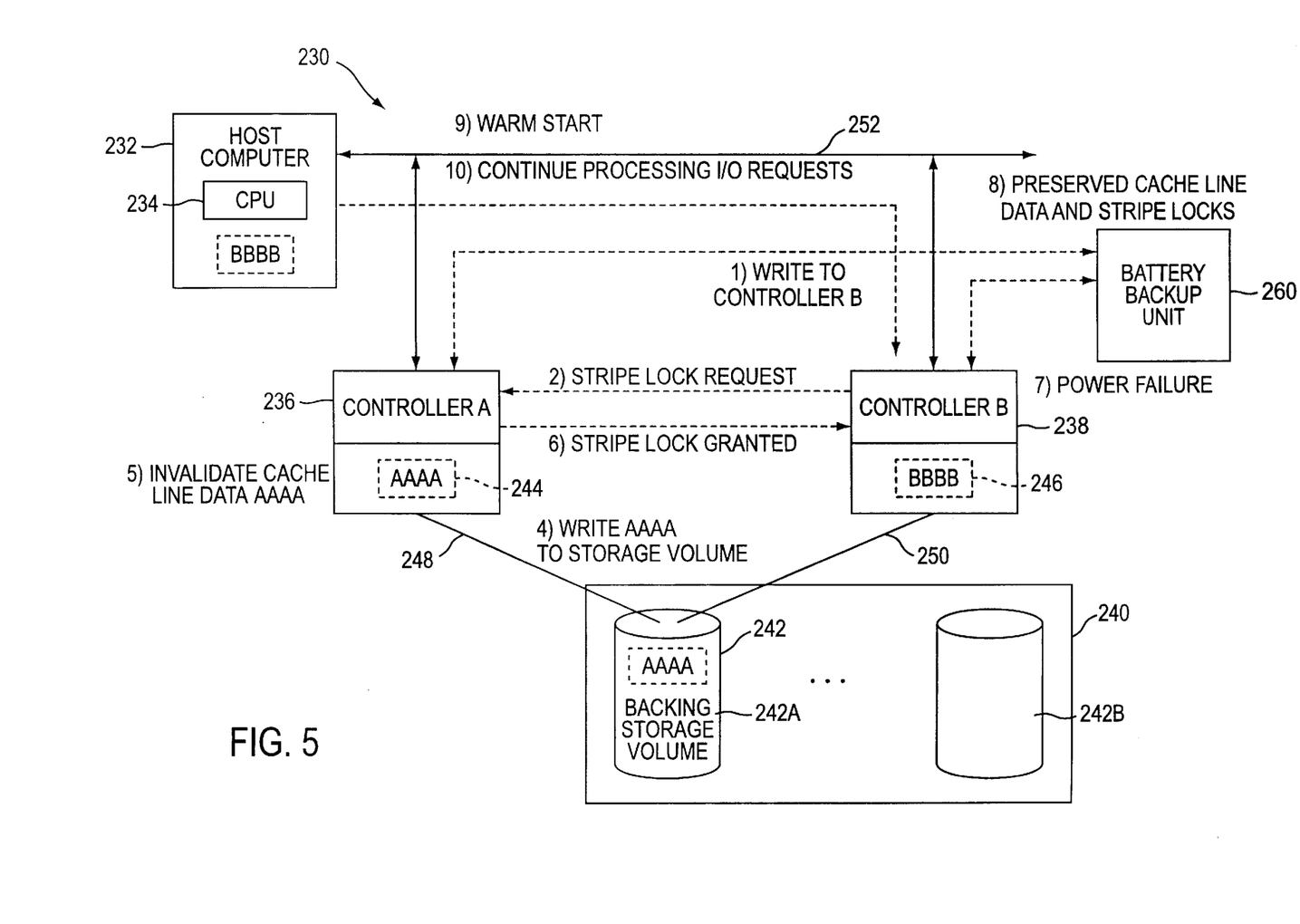
FIG. 5 is a diagrammatic representation of a warm start cache recovery in a dual-active controller environment utilizing stripe locks according to an embodiment of the invention.

Referring to FIG. 5, a storage volume reservation system 230 is depicted according to a first embodiment of the invention. Assuming controller A 232 had processed a write request for the data pattern "AAAA". Controller B 238 then receives a write request "BBBB" as indicated for the same storage volume location as the write request to controller A 232. In accordance with the inventive structure and method taught by the present invention, Controller B 238 would request a stripe lock from controller A 232. Controller A 232 would write the data pattern "AAAA" to the storage volume and invalidate any cache line data 244 overlapping cache line data 246. Controller A would then grant ControllerB 238 a stripe lock. Assuming a power failure occurs, a battery back up unit (BBU) 260 would save cache line data "BBBB" and the stripe lock (Note, since cache line data AAAA was invalidated, it is not saved). Consequently, during a warm start cache recovery the stipe lock and cache line data "BBBB" would be restored to controller B 238. Saving the stripe lock allows continued processing of I/O requests from the host computer 232 without incurring any delay required to establish stripe locks to any saved cache line data.

As described above, the information about the stripe locks is stored in memory that is preserved during a warm start. Since the only users of stripe locks after a warm start are dirty cache lines, some of the information stored in the stripe lock data structure requires adjustment. Adjustment of the stripe lock data structure is required before addition I/O requests can be processed from the host computer 232. In addition to the several fields in the data structure of each stripe lock that must be adjusted during a warm boot, the stripeLock::state for each stripe lock must be made consistent across controllers. As noted, the only users of a stripe lock after a warm boot are the dirty cache lines. Therefore, the only stripe locks that need to be preserved are those that are required by the dirty cache lines that need to be written to the storage volume 242.

Figure 6:
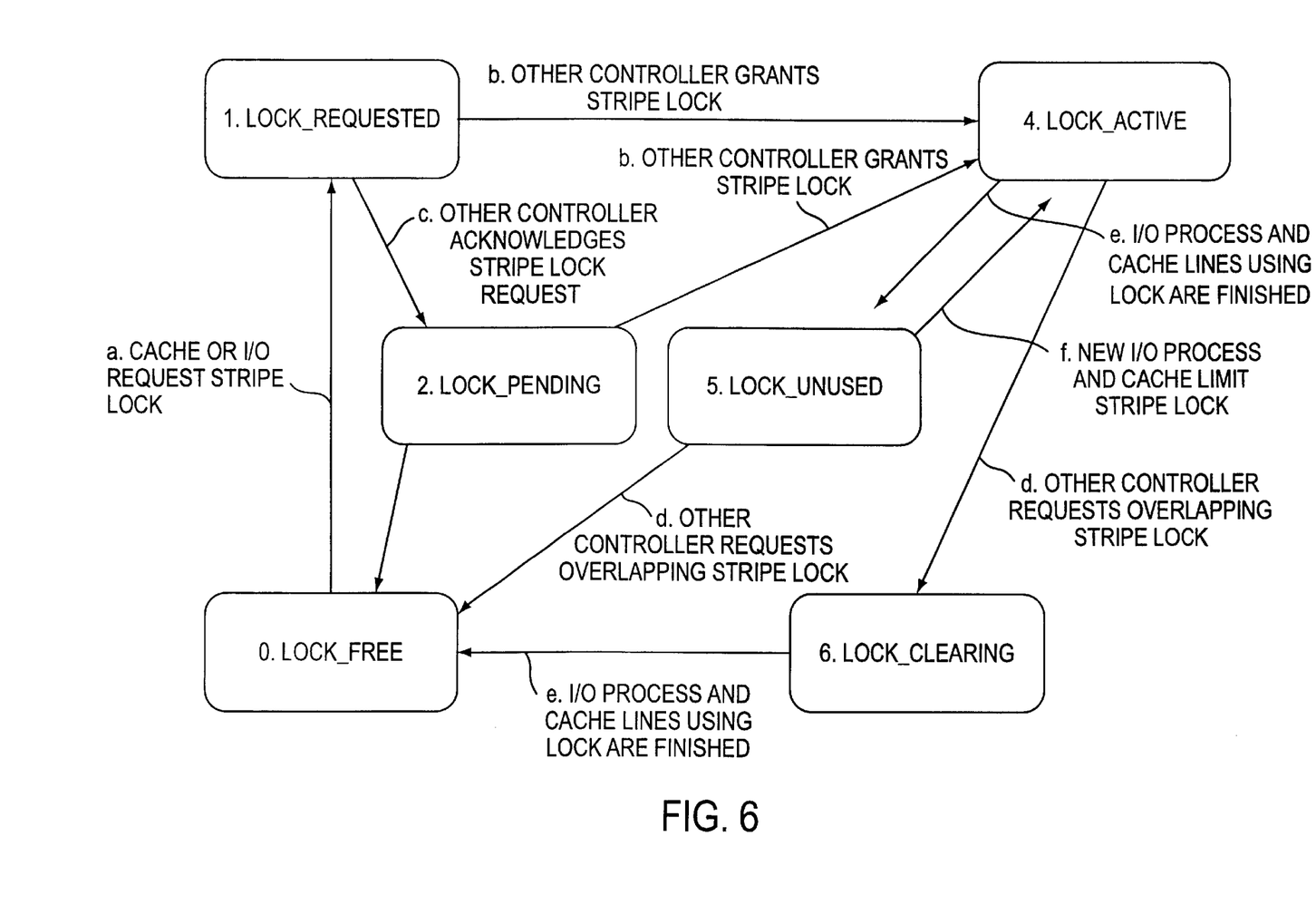
FIG. 6 is a stripe lock state transition diagram according to an embodiment of the invention.

The life cycle of a stripe lock is depicted in FIG. 6. Any cache line that has dirty data is using a lock in either the LOCK_ACTIVE or LOCK_CLEARING state. If the other controller has requested a stripe lock overlapping the extent covered by a stripe lock that is in the LOCK_ACTIVE state, then that stripe lock moves to the LOCK_CLEARING state while the cache lines and I/O using the stripe lock finish their operation. All other locks used by cache lines are in the LOCK_ACTIVE state. The lock fields that are adjusted for each stripe lock on a warm start are:

stripeLock::iopList
stripeLock::pendingLocks
stripeLock::useCount
stripeLock::state Since all I/O processes are terminated by a warm start, the stripeLock::iopList can be set to NULL. In addition, since at warm start there is no waiting I/O and no new locks need to be granted to alternate controllers, the pending Locks field may also be set to NULL. The only users of the stripe locks are the dirty cache lines that need to be flushed. Therefore the dirty lines need to be searched and a count taken of all the cache lines using each stripe lock. The stripeLock::useCount for each stripe lock is set to the number of cache lines using the lock. The stripeLock::state field may be modified as follows:

(1) Any lock that has no cache lines using it may be released and transition to the LOCK_FREE state;
(2) Any lock in the LOCK_CLEARING state may be moved back to the LOCK_ACTIVE state since any locks pending for the other controller will be released as they can not have any cache lines using them. The stripeLock::lockWaitCount will be zero for any lock in use. All locks not in use will be released so the lockWaitCount need not be adjusted.

Procedural method steps for updating any saved stripe locks as well as method steps for utilizing the stripe lock data structure as taught by the present invention are now described.

Figure 7:
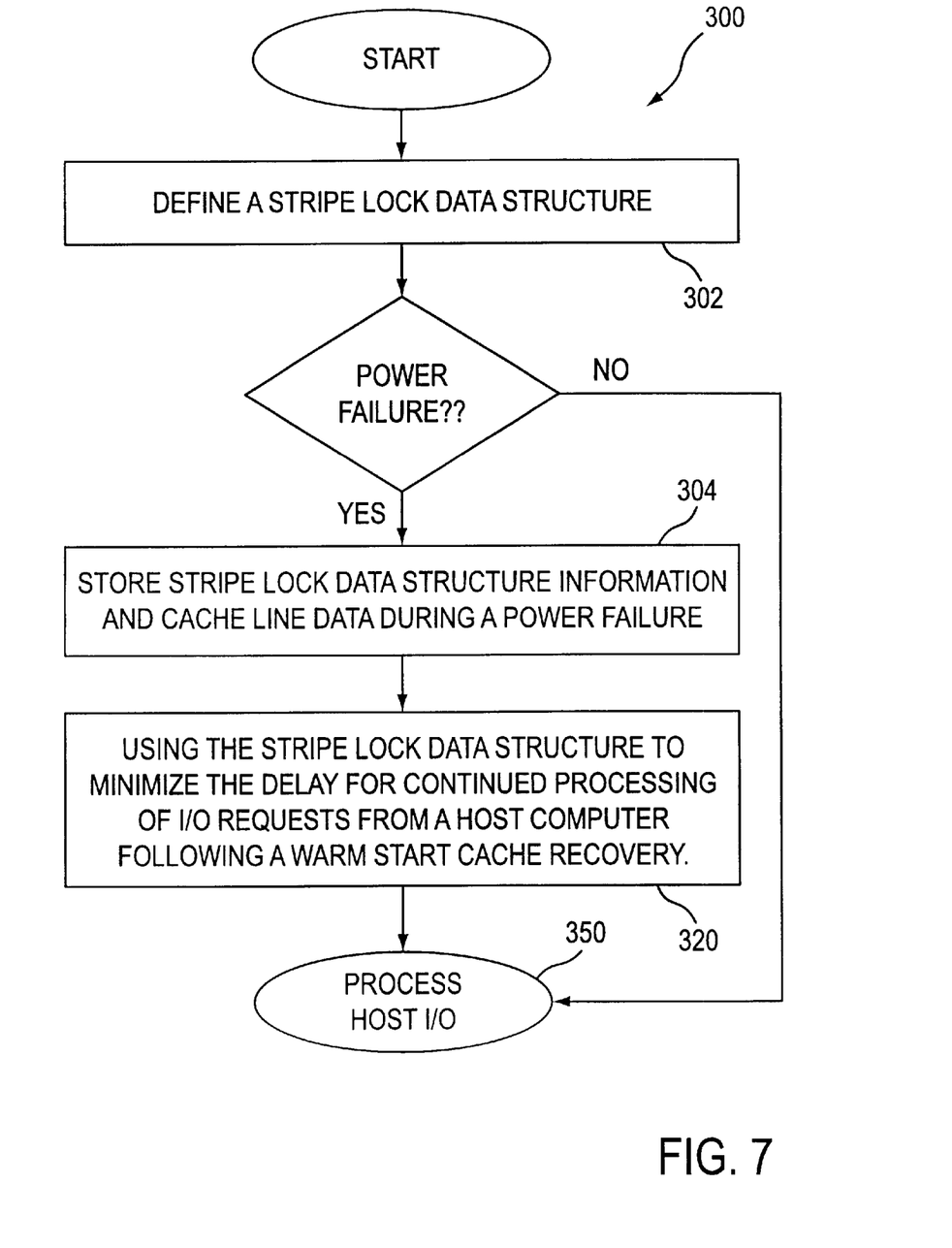
FIG. 7 depicts method steps for maintaining cache coherency amongst a plurality of caching controllers in a data storage system during a warm start cache recovery according to an embodiment of the invention.

FIG. 7 depicts an embodiment of a method 300 for maintaining cache coherency amongst a plurality of caching storage controllers 236, 238 in a data storage system 230 during a warm start cache recovery utilizing a stripe lock data structure, for example, as depicted in FIG. 5. At step 302, a stripe lock data structure is defined to maintain reservation status or stripe locks of cache lines within data extents that are part of a logical unit or storage volume 242. The stripe lock data structure is, for example, defined as depicted in Table I. At step 304, a battery backup unit (BBU) 260 stores the stripe lock data structure and cache line data of each of the plurality of caching storage controllers 236, 238 during a power failure. Finally at step 320, the stripe lock data structure is used to minimize a delay required for continued processing of I/O requests from one or more host computers 232 following the warm start cache recovery. The delay required before continued of host I/O request involves reestablishing stripe locks for any dirty cache line data save by the BBU 260 during the power failure. As described above, the stripe locks are required to maintain cache coherence among the plurality of controllers 236, 238 in the data storage system 230. However, since the stripe lock data structure of each controller 236, 238 is saved, processing of any host I/O requests can begin immediately following the warm start cache recovery.

Figure 8:
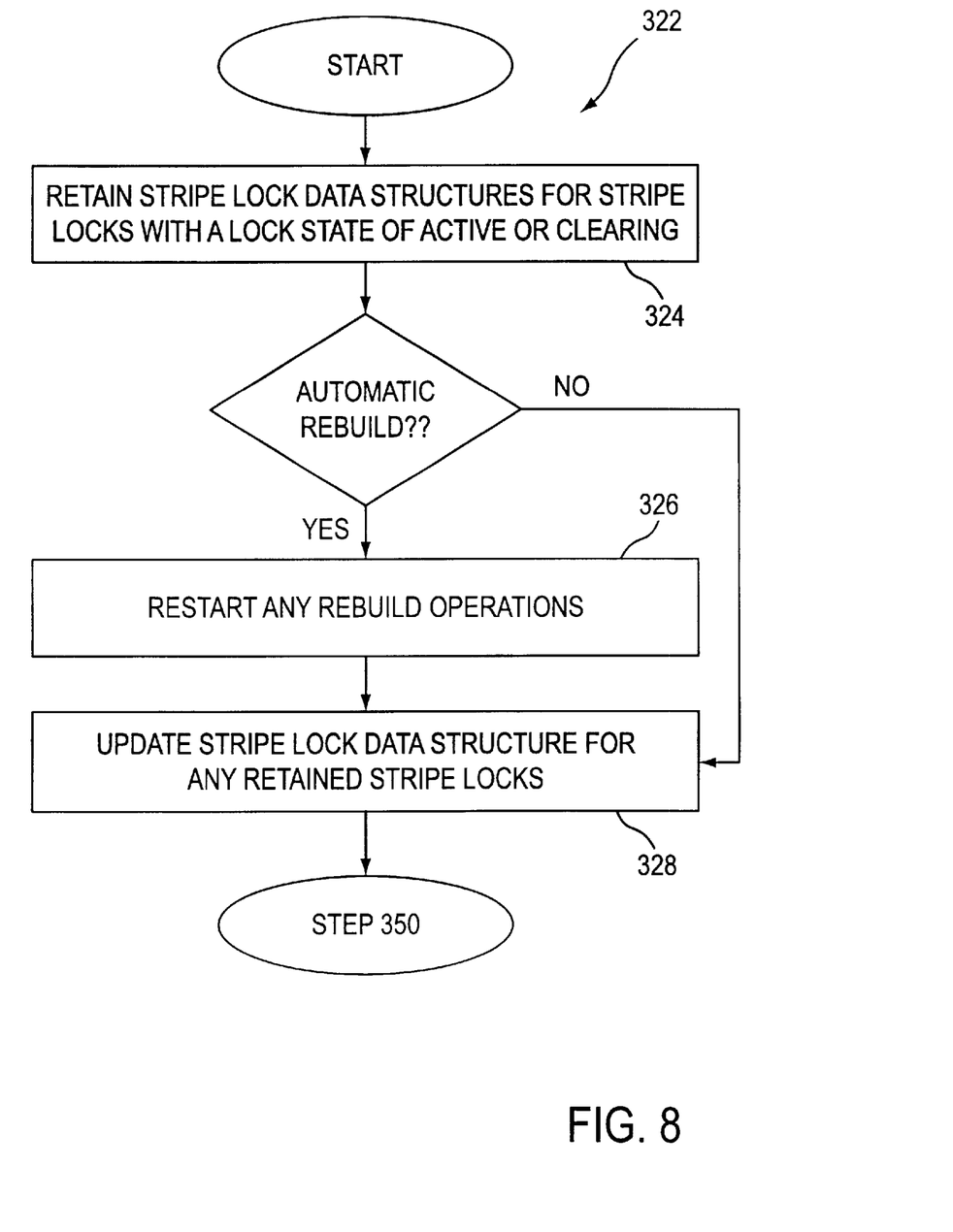
FIG. 8 depicts additional method steps for discarding stripe lock records during a warm start cache recovery according to an embodiment of the invention.

FIG. 8 depicts procedural method steps 322 for using the stripe lock data structure of step 320, for example, in the data storage system 230, as depicted in FIG. 5. At step 322, stripe lock records (SLR) for stripe locks having a lock state of either LOCK_ACTIVE or LOCK_CLEARING are retained. Recall stripe locks can have one of the following states: (1) LOCK_REQUESTED; (2) LOCK_PENDING; (3) LOCK_UNUSED; (4) LOCK_FREE; (5) LOCK_ACTIVE; or (6) LOCK_CLEARING. In addition, the stripe lock data structure is a stripe lock array of stripe lock records (SLR) as depicted in Table I. As described herein, the terms stripe lock and SLR are used interchangeably.

As described above, dirty cache line data is cache line data stored in a controller 236, 238 that has not yet been written to the storage volume 242. Referring to FIG. 6, such cache line data is utilizing a stripe lock in other the LOCK_ACTIVE state or the LOCK_CLEARING state. Otherwise, the data has not been accepted by the controller 236, 238 or is already written to the storage volume 242. Consequently, there is no need to save SLRs with a state of either: (1) LOCK_REQUESTED (host I/O waiting to be processed by a respective controller); (2) LOCK_PENDING (host I/O waiting to being processed by a respective controller but still awaiting a lock); (3) LOCK_UNUSED (an unused lock); or (4) LOCK_FREE (a free stripe lock). At step 326, when an automatic rebuild feature is enabled, any rebuild operations are restarted. Finally at step 326, the stripe lock data structure is updated for retained stripe locks and corresponding SLRs.

Figure 9:
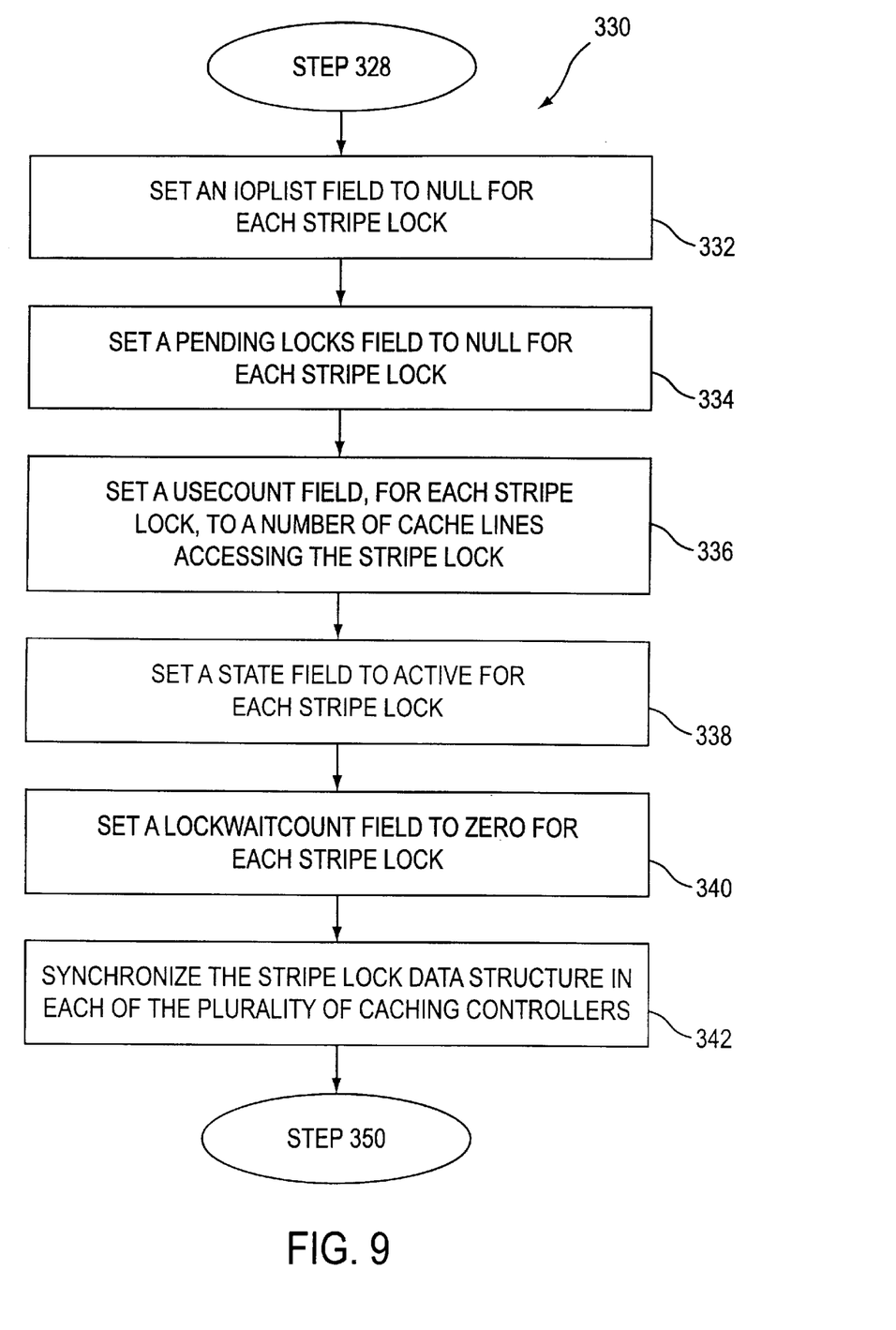
FIG. 9 depicts additional method steps for updating a stripe lock data structure following the warm start cache recovery according to an embodiment of the invention.

FIG. 9 depicts procedural method steps 330 for updating the stripe lock data structure step of step 328. As described above, the stripe lock data structure fields must be updated before additional I/O processes from the host 232 are processed. At step 332, an iopList field is set to NULL for each stripe lock. At step 332, a pendingLocks field is set to NULL for each stripe lock. At step 334, a useCount field, for each stripe lock, is set to a number of cache lines accessing the respective stripe lock. At step 336, a state field is set to ACTIVE for each stripe lock. At step 338, a lockWaitCount field is set to zero for each stripe lock. As noted above the field of the retained stripe locks refer to the fields described in the SLR as depicted in Table I. Finally at step 340, the stripe lock data structure is synchronized in each of the plurality of caching storage controllers. The stripe lock data structure is synchronized in each of the plurality of caching storage controllers using, for example, the SVORQ message as described above.

Figure 10:
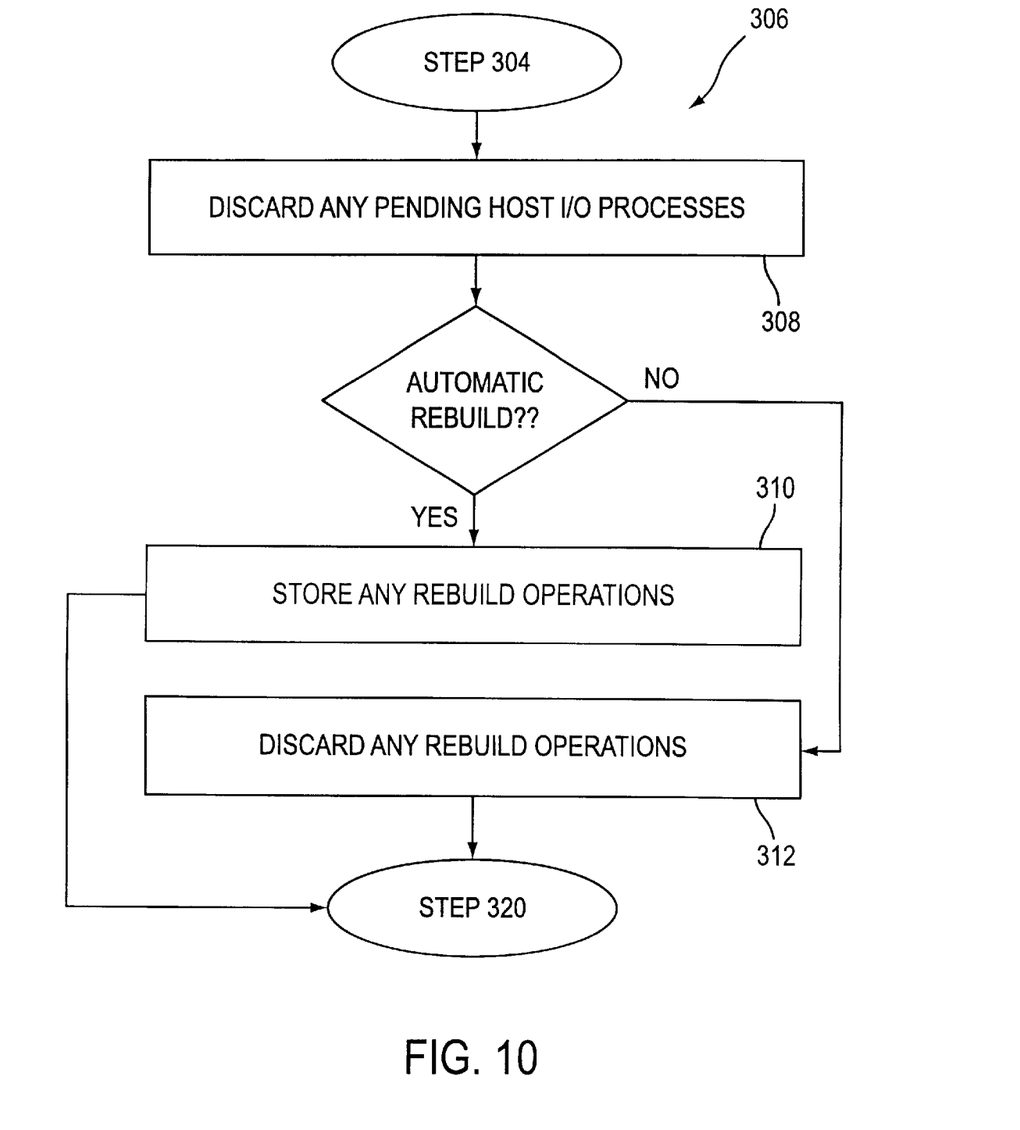
FIG. 10 depicts additional method steps for discarding I/O processes during a power failure according to an embodiment of the invention.

FIG. 10 depicts procedural method steps 306 for storing the stripe lock data structure step of step 304. At step 308, any pending host I/O processes are discarded. The host computer 232 will re-request any unacknowledged I/O requests and resend the requests following the warm start cache recovery. At step 310 when an automatic rebuild feature is enabled, any rebuild operations are stored. Finally at step 312, when the automatic rebuild feature is not enabled, any rebuild operations are discarded. Additional details regarding rebuild operations are known to those skilled in the art and are therefore not set forth herein except as needed for a proper understanding of the invention.

Exemplary embodiments have been described with reference to specific configurations. Those skilled in the art will appreciate that various changes and modifications can be made while remaining within the scope of the claims.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the stripe locks while maintaining substantially the same functionality without departing from the scope and spirit of the present invention. In addition, although the preferred embodiment described herein is directed to a data storage system, it will be appreciated by those skilled in the art that the teachings of the present invention can be applied to other data processing systems utilizing system drives configured differently than the 4+1 RAID 5 system drive described herein without departing from the scope and spirit of the present invention.

The invention provides many advantages over known techniques. Advantages of the inventive method and structure eliminate the delay required re-establish stripe locks in order to flush dirty cache line data to a storage volume during a warm start cache recovery.

Having disclosed exemplary embodiments and the best mode, modifications and variations may be made to the disclosed embodiments while remaining within the scope of the invention as defined by the following claims.

What is claimed is:

1. A method of maintaining cache coherency amongst a plurality of caching storage controllers in a data storage system during a warm start cache recovery, the method comprising steps of:

defining a stripe lock data structure to maintain reservation status or stripe locks of cache lines within data extents that are part of a logical unit or storage volume;

storing, by a battery backup unit (BBU), the stripe lock data structure and cache line data of each of the plurality of caching storage controllers during a power failure; and using the stripe lock data structure to minimize a delay required for continued processing of I/O requests from one or more host computers following the warm start cache recovery.

2. The method of claim 1, wherein the using the stripe lock data structure step further comprises steps of:

retaining stripe lock data structure information for stripe locks having a lock state of either LOCK_ACTIVE or LOCK_CLEARING; and when an automatic rebuild feature is enabled, restarting any rebuild operations; and updating stripe lock data structure information for retained stripe locks.

3. The method of claim 2, wherein the updating the stripe lock data structure information step further comprises steps of:

setting an iopList stripe lock field to NULL for each stripe lock;

setting a pendingLocks stripe lock field to NULL for each stripe lock;

setting a useCount stripe lock field, for each stripe lock, to a number of cache lines accessing each stripe lock;

setting a state stripe lock field to ACTIVE for each stripe lock;

setting a lockWaitCount stripe lock field to zero for each stripe lock; and synchronizing the stripe lock data structure information in each of the plurality of caching storage controllers.

4. The method of claim 1, wherein the storing the stripe lock data structure information step further comprises steps of:

discarding any pending host I/O processes; and when an automatic rebuild feature is not enabled, discarding any rebuild operations.

5. A computer program product for maintaining cache coherency amongst a plurality of caching storage controllers in a data storage system during a warm start cache recovery, the computer program product including a computer readable medium and a computer mechanism stored thereon, the computer mechanism comprising instructions for:

defining a stripe lock data structure to maintain reservation status (stripe lock) of cache lines within data extents that are part of a logical unit or storage volume;

storing stripe lock data structure information and cache line data of each of the plurality of caching storage controllers during a power failure; and using the stripe lock data structure to minimize a delay required for continued processing of I/O requests from one or more host computers following the warm start cache recovery.

6. The computer program product of claim 5, wherein the instruction for using the stripe lock data structure further comprises instructions for:

retaining stripe lock data structure information for stripe locks having a lock state of either LOCK_ACTIVE or LOCK_CLEARING; and when an automatic rebuild feature is enabled, restarting any rebuild operations; and updating stripe lock data structure information for retained stripe locks.

7. The computer program product of claim 5, wherein the instruction for updating the stripe lock data structure information step further comprises instructions for:

setting an iopList stripe lock field to NULL for each stripe lock;

setting a pendingLocks stripe lock field to NULL for each stripe lock;

setting a useCount stripe lock field to a number cache lines accessing each stripe lock;

setting a state stripe lock field to ACTIVE for each stripe lock;

setting a lockWaitCount stripe lock field to zero for each stripe lock; and synchronizing the stripe lock data structure information in each of the plurality of caching storage controllers.

8. The computer program product of claim 5, wherein the instruction for storing the stripe lock data structure information step further comprises instructions for:

discarding any pending host I/O processes; and when an automatic rebuild feature is not enabled, discarding any rebuild operations.

9. In a computing environment that allows data access through two or more caching controllers, a storage volume reservation system comprising:

a stripe lock data structure defined in memory within each of said two or more caching controllers, the stripe lock data structure providing consistent information within each of the two or more caching controllers; and a battery backup unit configured to save the stripe lock data structure and cache line data of each of the two or more caching controllers during a power failure, such that the stripe lock data structure minimizes a delay required for continued processing of I/O requests from one or more host computers following the warm start cache recovery.

10. In a data storage system having a plurality of storage controllers, a method of maintaining cache coherency amongst said storage controllers during a warm start cache recovery, the method comprising steps of:

defining a stripe lock data structure in a memory to maintain reservation status or stripe locks of cache lines within data extents that are part of a logical unit or storage volume;

storing the stripe lock data structure and cache line data of at least one of said plurality of caching storage controllers during a power failure; and using information stored in the stripe lock data structure to minimize delay in continued processing of input/output requests from a host computer coupled to said data storage system following a warm start cache recovery.

11. The method in claim 10, wherein the storing is performed by a battery backed up unit (BBU).

12. The method of claim 10, wherein the using the stripe lock data structure step further comprises steps of:

retaining stripe lock data structure information for stripe locks having a either an active lock state or a clearing lock state.

13. The method of claim 12, further comprising steps of:

when an automatic rebuild feature is enabled, restarting any rebuild operations; and updating said stripe lock data structure information for retained stripe locks.

14. The method of claim 13, wherein the updating the stripe lock data structure information step further comprises steps of:

setting an Input/Output Processes List (iopList) stripe lock field to NULL for each stripe lock;

setting a pending locks (pendingLocks) stripe lock field to NULL for each stripe lock;

setting a sue count (useCount) stripe lock field, for each stripe lock, to a number of cache lines accessing each stripe lock;

setting a state stripe lock field to ACTIVE for each stripe lock;

setting a lock wait count (lockWaitCount) stripe lock field to zero for each stripe lock; and synchronizing the stripe lock data structure information in each of the plurality of caching storage controllers.

15. The method of claim 10, wherein the storing the stripe lock data structure information step further comprises steps of:

discarding any pending host I/O processes; and when an automatic rebuild feature is not enabled, discarding any rebuild operations.

16. The method of claim 10, wherein said storage system comprises a RAID and said storage controller comprises a RAID controller.

17. A caching storage controller device, comprising:

a memory defining a stripe lock data structure and storing:

stripe locks of cache lines within data extents that are part of a logical unit or storage volume shared by a plurality of caching storage controller devices;

the controller device configured to use the stripe lock data structure and cache line data saved by a battery backup unit (BBU) during a power failure to minimize a delay required for continued processing of I/O requests from one or more host computers following a warm start cache recovery.

18. The apparatus of claim 17, wherein at least a subset of the plurality of caching storage controller devices are RAID controllers.

19. A method for using a caching storage controller device, the method comprising steps of:

defining a stripe lock data structure in a memory of the caching storage controller to maintain reservation status or stripe locks of cache lines within data extents that are part of a logical unit or storage volume shared by a plurality of caching storage controller devices;

storing, by a battery backup unit (BBU), the stripe lock data structure and cache line data of each of the plurality of caching storage controllers during a power failure; and using the stripe lock data structure to minimize a delay required for continued processing of I/O requests from one or more host computers following the warm start cache recovery.

* * * * *